United States Patent
Tremel

(10) Patent No.: US 11,591,942 B2
(45) Date of Patent: *Feb. 28, 2023

(54) FILTER ELEMENT FOR A PARTICULATE FILTER, EXHAUST GAS PARTICULATE FILTER, PROCESS FOR MANUFACTURING A FILTER ELEMENT, AND USE OF A COATING MATERIAL

(71) Applicant: AUDI AG, Ingolstadt (DE)

(72) Inventor: Peter Tremel, Nuremberg (DE)

(73) Assignee: AUDI AG, Ingolstadt (DE)

(*) Notice: Subject to any disclaimer, the term of this patent is extended or adjusted under 35 U.S.C. 154(b) by 0 days.

This patent is subject to a terminal disclaimer.

(21) Appl. No.: 17/259,675

(22) PCT Filed: Jul. 24, 2019

(86) PCT No.: PCT/EP2019/069959
§ 371 (c)(1),
(2) Date: Jan. 12, 2021

(87) PCT Pub. No.: WO2020/020966
PCT Pub. Date: Jan. 30, 2020

(65) Prior Publication Data
US 2021/0129066 A1 May 6, 2021

(30) Foreign Application Priority Data
Jul. 25, 2018 (DE) ...................... 10 2018 212 370.5

(51) Int. Cl.
*F01N 3/035* (2006.01)
*F01N 3/022* (2006.01)

(52) U.S. Cl.
CPC .......... *F01N 3/035* (2013.01); *F01N 3/0222* (2013.01); *F01N 2330/06* (2013.01); *F01N 2510/06* (2013.01); *F01N 2510/0682* (2013.01)

(58) Field of Classification Search
None
See application file for complete search history.

(56) References Cited

U.S. PATENT DOCUMENTS

| 4,916,897 A * | 4/1990 | Hayashi | B01D 53/944 181/254 |
| 2007/0217978 A1 | 9/2007 | Baican et al. | |

(Continued)

FOREIGN PATENT DOCUMENTS

| CN | 102188858 A | 9/2011 |
| CN | 102196853 A | 9/2011 |

(Continued)

OTHER PUBLICATIONS

Machine translation of JP 2014-181638 translated Via EPO Jun. 25, 2022. (Year: 2014).*

(Continued)

*Primary Examiner* — Elizabeth Collister
(74) *Attorney, Agent, or Firm* — Maier & Maier, PLLC

(57) ABSTRACT

A filter element for a particle filter having a porous filter body made of a ceramic material and including a plurality of flow channels extending fluidically in parallel. The filter body is provided at least in a part of the flow channels with a coating made of a coating material, which is different from the ceramic material and is made up of orthorhombic crystals. A particle filter, a method for producing a filter element, and the use of a coating material for coating a filter element is also provided.

13 Claims, 1 Drawing Sheet

(56) References Cited

U.S. PATENT DOCUMENTS

2010/0266461 A1 10/2010 Sappok et al.
2012/0294792 A1 11/2012 Southward et al.

FOREIGN PATENT DOCUMENTS

| CN | 103080046 A | 5/2013 | |
|---|---|---|---|
| DE | 69626914 T2 | 1/2004 | |
| DE | 20 2006 017 355 U1 | 4/2007 | |
| EP | 0 153 911 A1 | 9/1985 | |
| EP | 2 043 964 B1 | 6/2013 | |
| EP | 2 614 872 A1 | 7/2013 | |
| JP | H03-238046 A | 10/1991 | |
| JP | 2014-181638 A | 9/2014 | |
| WO | 8503240 A1 | 8/1985 | |
| WO | WO-8503241 A1 * | 8/1985 | ......... B01D 53/9454 |

OTHER PUBLICATIONS

German Examination Report dated Jan. 24, 2022, corresponding to German Application No. 102019200180.7; 4 pages.
International Search Report dated Nov. 6, 2019 in corresponding International application No. PCT/EP2019/069959; 7 pages.
Written Opinion of the International Searching Authority dated Nov. 6, 2019 in corresponding International application No. PCT/EP2019/069959; 10 pages including Machine-generated English-language translation.
International Preliminary Report on Patentability dated Nov. 24, 2020 in corresponding International application No. PCT/EP2019/069959; 16 pages.
Written Opinion under Rule 66 dated Jun. 24, 2020 in corresponding International application No. PCT/EP2019/069959; 12 pages including Machine-generated English-language translation.
Examination Report dated Jun. 19, 2019 in corresponding German application No. 10 2019 200 180 7; 10 pages including Machine-generated English-language translation.
Examination Report dated Dec. 11, 2020 in corresponding German application No. 10 2019 200 180.7; 10 pages including Machine-generated English-language translation.
International Search Report dated Nov. 11, 2019 in corresponding International application No. PCT/EP2019/069960; 8 pages.
Written Opinion of the International Searching Authority dated Nov. 11, 2019 in corresponding International application No. PCT/EP2019/069960; 11 pages including Machine-generated English-language translation.
International Preliminary Report on Patentability dated Nov. 16, 2020 in corresponding International application No. PCT/EP2019/069960; 15 pages.
Written Opinion under Rule 66 dated Jun. 24, 2020 in corresponding International application No. PCT/EP2019/069960; 12 pages including Machine-generated English-language translation.
Office Action dated Oct. 11, 2021, in connection with corresponding Chinese Application No. 201980047127.X (10 pp., including partial machine-generated English translation).

* cited by examiner

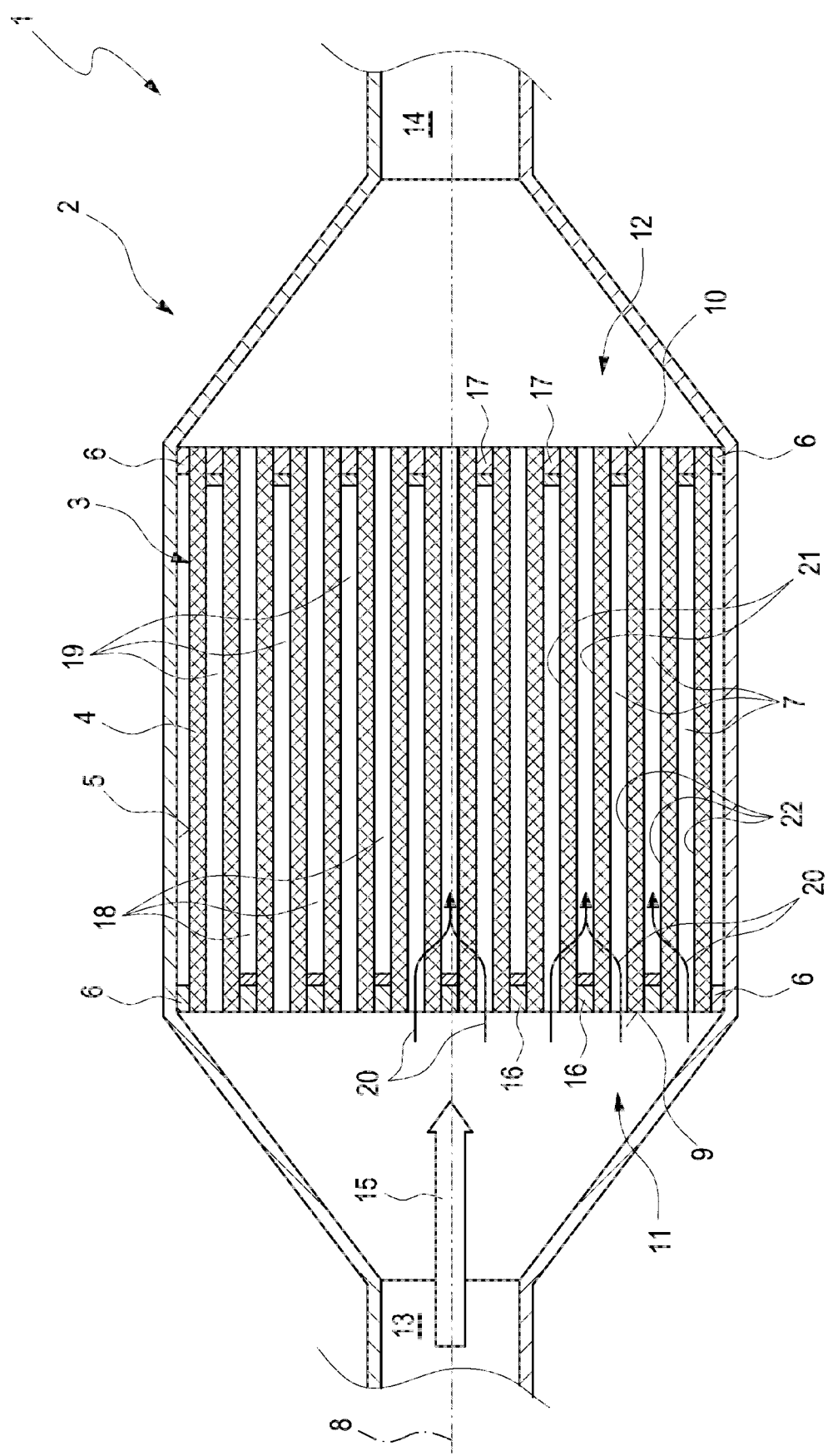

FILTER ELEMENT FOR A PARTICULATE FILTER, EXHAUST GAS PARTICULATE FILTER, PROCESS FOR MANUFACTURING A FILTER ELEMENT, AND USE OF A COATING MATERIAL

FIELD

The disclosure relates to a filter element for a particle filter, having a porous filter body made of a ceramic material and including a plurality of flow channels extending fluidically in parallel. The disclosure also relates to an exhaust gas particle filter, a method for producing a filter element, and the use of a coating material for coating a filter element.

BACKGROUND

For example, document DE 20 2006 017 355 U1 is known from the prior art. This relates to a porous ceramic honeycomb substrate having a porosity in the range from approximately 60% to approximately 85%, having a structure which is essentially formed from bonded ceramic fibers, and includes an array of honeycomb-shaped channels, and wherein the honeycomb substrate is produced by an extrusion process comprising the following steps: mixing the ceramic material fiber with additives and a fluid to form an extrudable mixture; extruding the extrudable mixture to form a honeycomb green body substrate; and curing the green body substrate to form the porous honeycomb substrate.

Furthermore, document EP 2 043 964 B1 describes a porous ceramic honeycomb structure having a primary cordierite ceramic phase, which has the following: $E_{ratio}<1.01$, wherein $E_{ratio}=E_H/E_{RT}$, wherein $E_{RT}$ is a room temperature modulus of elasticity at 25° C. and $E_H$ is a high temperature modulus of elasticity at 1000° C., and TSP>525° C., wherein TSP is a temperature shock parameter, defined as $TSP=MOR_{RT}/[E_{RT}][CTE_H]$, wherein $MOR_{RT}$ is a room temperature tear resistance modulus and $CTE_H$ is a high temperature coefficient of thermal expansion between 500 and 900° C., wherein the structure has an overall porosity of >55%.

SUMMARY

It is the object of the disclosure to propose a filter element for a particle filter which has advantages over known filter elements, in particular also has a low pressure loss with increasing operating time.

This is achieved according to the disclosure by a filter element for a particle filter. It is provided that the filter body is provided at least in a part of the flow channels with a coating of a coating material, which is different from the ceramic material and is made up of orthorhombic crystals.

The filter element is preferably part of the particle filter, which in turn can be designed as an exhaust gas particle filter. The exhaust gas particle filter is, for example, part of an exhaust system, which in turn can be associated with an exhaust gas-producing device, in particular a drive unit of a drive device, preferably an internal combustion engine. The drive device is used, for example to drive the motor vehicle and thus to supply a torque that is oriented toward driving the motor vehicle. The exhaust gas-producing device or the drive unit produces exhaust gas during its operation. The exhaust system is used to discharge this exhaust gas from the exhaust gas-producing device in the direction of or into an external environment of the exhaust system.

The exhaust system includes at least one exhaust gas posttreatment device, namely the particle filter designed as an exhaust gas particle filter. This is used to remove particles, for example soot particles, from the exhaust gas flowing through the exhaust system. In addition to the particle filter, at least one further exhaust gas posttreatment device, for example a vehicle catalytic converter or a catalytic converter and/or a further particle filter, can of course be part of the exhaust system. The exhaust gas flowing through the exhaust system is fed to the particle filter, in particular all of the exhaust gas. However, the filter element described can in principle be used for all types of particle filters, for example the particle filter is in the form of a room air filter of a ventilation device, an air conditioning system, or the like.

The filter element has the filter body, which is porous or consists of the porous ceramic material. There are numerous flow channels in the filter body, which are arranged fluidically in parallel and preferably each penetrate completely through the filter body. The flow channels are particularly preferably straight, in particular continuously straight. For example, they penetrate on the one hand through a first end face of the filter body and on the other hand through a second end face of the filter body opposite to the first end face. In other words, the flow channels each extend, starting from the first end face, to the second end face and penetrate through it.

The filter body is used to filter a fluid, in particular the exhaust gas, and thus to separate particles contained in the fluid. The filter body or the ceramic material can have a non-uniform porosity. This means that the pores of the filter body that determine the filtration performance of the filter body are statistically distributed in size. This always results in a compromise between filtration performance and counter pressure or pressure loss which is caused by the filter body. It can be provided that the filter element is regenerated from time to time in order to at least partially remove the particles from the filter element. This can produce ash, which remains permanently in the filter element. In addition, ash can be introduced into the filter element, which is caused by the combustion of lubricants and/or additives in the drive unit.

The filter body usually has two filtration mechanisms, namely depth filtration and surface filtration. In the case of depth filtration, the particles are separated in a wall of the filter body that delimits at least one of the flow channels or in the ceramic material. In the case of surface filtration, the filtration takes place on a surface of the filter body, i.e., on the wall or on the ceramic material. Depth filtration is linked to a high increase in counter pressure or a high pressure loss, because the permeability of the exhaust gas is negatively influenced by depth filtration.

If the pores present in the filter body are partially or completely occupied with particles due to the introduction of the particles by depth filtration, the particles are subsequently largely deposited on the filter body in the course of surface filtration. Over the running time, the filtration effectuated by the filter body thus shifts from depth filtration to surface filtration. With the same amount of particles entering the filter body, surface filtration results in a lower pressure increase than depth filtration.

The ceramic material from which the filter body is made can in principle be chosen as desired. Preferably silicon carbide or cordierite is used as ceramic material or the ceramic material includes at least a portion of silicon carbide and/or cordierite. The ceramic material is preferably a fiber-reinforced ceramic material, so that the ceramic material contains reinforcing fibers, for example mineral fibers.

The reinforcing fibers are preferably oriented in a specific direction in the filter body, particularly preferably parallel to the flow channels.

It can be provided that the filter body is provided with a coating of minerals and/or mineral compounds. $Al_2O_3$, MgO, $TiO_2$, or the like are used as minerals, for example. However, such a coating causes an increase in counter pressure or pressure loss because the coating penetrates the pores of the filter body and increases the permeability to the exhaust gas.

For this reason, the invention provides for the filter body to be provided with the coating, which consists of the coating material, at least in part of the flow channels, in particular in all flow channels or in only a part of the flow channels. The coating material is different from the ceramic material and consists of orthorhombic crystals or at least contains orthorhombic crystals. The orthorhombic crystals are to be understood as crystals which have point groups having three mutually perpendicular twofold axes of rotation or rotation inversion. The crystals contained in the coating material are thus present in the orthorhombic crystal system or belong to it.

The use of the orthorhombic crystals has the advantage that they do not penetrate or at most only slightly penetrate the pores of the porous filter body, but rather accumulate on its surface. In this respect, the crystals prevent particles from penetrating into the pores of the filter body during operation of the filter element or the particle filter. The depth filtration described above is thus at least partially prevented with the aid of the orthorhombic crystals, so that the particles are filtered out of the fluid by the filter element essentially by surface filtration. As a result, an increase in the counter pressure or pressure loss over the operating life of the filter element is significantly reduced in comparison to a filter element which at least at times predominantly filters out the particles by means of depth filtration. In this respect, a significant increase in the filtration performance of the filter element is achieved without a significant increase in the counter pressure. In addition, the application of the coating material to the filter body is extremely simple and can be done solely mechanically, for example.

The coating can, for example, be applied directly to the filter body. However, it can also be provided that the coating is applied to a catalytically active coating, which can also be referred to as a catalyst coating. In this case, provision is thus made to initially provide the filter body with the catalyst coating at least in some areas, in particular in at least a part of the flow channels or in all flow channels. The coating is then applied, specifically again at least in a part of the flow channels. It is preferably provided here to apply the catalyst coating in all flow channels, but the coating only in some of the flow channels, i.e., not in all flow channels. The catalyst coating can be in the form of a three-way coating or a three-way catalyst coating.

A further embodiment of the invention provides that the coating material has a specific surface area of at least 200 $m^2/g$ and/or that the coating material has particles having a grain size of at least 1 μm to at most 20 μm and/or that an amount of material of the coating material applied to the filter body in relation to a total volume of the filter body is 2 g/l to 5 g/l. The specific surface area of the coating material is preferably significantly greater than the specific surface area of the ceramic material or of the filter body. By applying the coating material to the filter body in the form of the coating, the filtration performance of the filter body can thus be significantly improved.

The coating material has the specific surface area of at least 200 $m^2/g$, at least 250 $m^2/g$, at least 300 $m^2/g$, at least 350 $m^2/g$, or at least 400 $m^2/g$. A particularly high filtration performance of the filter body is achieved by such a selection of the coating material. Additionally or alternatively, the coating material includes particles having a grain size of at least 1 μm to at most 20 μm before it is applied to the filter body. The grain size is thus at least 1 μm, at least 2.5 μm, or at least 5 μm. Additionally or alternatively, the grain size is at most 20 μm, at most 15 μm, or at most 10 μm. The grain size is particularly preferably between 5 μm and 10 μm. The grain size of the coating material is preferably selected as a function of a pore size of the pores of the filter body. In particular, the grain size of the particles of the coating material is larger than the mean pore size of the filter body. The grain size denotes, for example, the mean particle size D50.

Additionally or alternatively, the total amount of coating material applied to the filter body-based on the total volume of the filter body—is 2 g/l to 5 g/l, preferably 3 g/l to 4 g/l. The total volume of the filter body is preferably to be understood as the geometric volume of the filter body or, alternatively, the volume of the ceramic material of which the filter body consists. The amount of material described enables a particularly significant increase in filtration performance.

A further embodiment of the invention provides that the coating is applied mechanically by atomizing and suctioning on the coating material. The coating is applied by generating a fluid flow through the filter body, namely by providing a negative pressure on one side of the filter body. Due to the negative pressure, the fluid flow is effectuated through the filter body, wherein the fluid is suctioned on at a first side of the filter body and flows toward a second side on which the negative pressure is present. For example, there is ambient pressure on the second side.

The coating material is now introduced into the fluid flow in such a way that it is suctioned on and suctioned into the filter body. Here, the coating material is deposited on the filter body, in particular on a wall of the filter body that delimits the flow channels. The application of the coating made up of the coating material takes place purely mechanically in this respect and is therefore particularly easy to implement. In addition, it can of course be provided that the coating material is chemically fixed, for example by means of an adhesive or the like.

For example, it is provided that multiple flow channels are closed by means of first closure plugs on an inlet side of the filter body and multiple flow channels are closed by means of second closure plugs on an outlet side of the filter body. The first closure plugs are arranged closer to the inlet side than the second closure plugs. Conversely, the second closure plugs are arranged closer to the outlet side than the first closure plugs. For example, one part of the flow channels is closed by means of the first closure plugs arranged on the inlet side, whereas another part of the flow channels is closed by means of the second closure plugs arranged on the outlet side. Preferably, either a first closure plug or a second closure plug is therefore present in each of the flow channels.

Provision can be made for the coating to be formed before the closure plugs are introduced into the flow channels, thus to introduce the coating material into the flow channels before the closure plugs are arranged in them. In such a procedure, the coating material introduced into the fluid flow is deposited in all flow channels because the fluid flow flows evenly through all flow channels. Alternatively, provision can be made for the closure plugs to be arranged in the flow channels before the coating is formed. It can be provided here to arrange all first closure plugs, but not the second closure plugs, all second closure plugs, but not the first closure plugs, or both the first closure plugs and the second closure plugs in the flow channels. The above-mentioned first side corresponds, for example, to the inlet side and the second side to the outlet side, so that the fluid flow flows through the filter body from the inlet side in the direction of the outlet side.

Depending on which of the closure plugs are already arranged in the filter body, the fluid flow directly strikes the wall of the filter body, which delimits the flow channels, or first has to flow through the porous filter body. As it flows through the filter body, the coating material is separated from the fluid flow, so that it is deposited on the wall of the filter body. This means that the coating material is subsequently only present on the filter body where the fluid flow directly strikes the wall of the filter body. In the above-described flow direction from the inlet side toward the outlet side, the coating material is thus deposited only in those flow channels that are closed by means of the second closure plugs if both the first closure plugs and the second closure plugs are present. No coating material is deposited in the flow channels closed by means of the first closure plugs because it has already been separated from the fluid flow before entering them by passing through the wall or the filter body.

In the context of a further preferred embodiment of the invention it is provided that the coating material is applied to the filter body in such a way that the coating includes fluffy piles of the coating material. The piles are distinguished in particular in that the particles of the coating material entangle with one another during the application to the filter body, so that before the application of the coating material, the individual particles contained in the coating material have a smaller grain size than after the formation of the coating. For example, the grain size of the particles after the production of the coating on the filter body is larger by a factor of at least 2, at least 2.5 or at least 3 than the grain size of the particles before application to the filter body, in particular immediately before the application.

The formation of the fluffy piles of the coating material is achieved in particular by a specific flow velocity of the fluid flow through the filter body. For example, a flow velocity of 2 m/s to 6 m/s, in particular 3 m/s to 4 m/s, is provided. At a higher flow velocity, larger accumulations of particles form on the filter body, which negatively influence the counter pressure of the filter element. At a lower flow velocity, however, the particles are distributed over the entire area of the filter body. This also has a negative effect on the counter pressure. The arrangement of the particles of the coating material in the form of the fluffy piles, which ultimately form the coating, has the advantage that a high filtration performance is achieved with low counter pressure at the same time.

A further embodiment of the invention provides that the coating material includes a sheet silicate. The sheet silicate is understood to be a silicate whose silicate anions consist of layers of corner-linked $SiO_4$ tetrahedra. The use of the sheet silicate as a component of the coating material has the advantage of a particularly high filtration performance.

Finally, it can be provided in the scope of a further embodiment of the invention that the layered silicate is sepiolite or montmorillonite. The sepiolite is a magnesium silicate and is one of the sheet silicates. It crystallizes in the orthorhombic crystal system. Sepiolite can be used as a coating material in various processing forms. The products Pangel B20, Pangel B40, and Pangel FF of the Tolsa Group are mentioned as different processing forms for sepiolite. Each of these products can be used as a coating material alone or in a mixture with further components, in particular at least one further one of the mentioned products. Additionally or alternatively, the coating material can be or at least include montmorillonite. The montmorillonite can form the coating material alone or together with at least one further component. For example, bentonite is used as the coating material, wherein montmorillonite is an essential component of bentonite. The use of the mentioned materials as a sheet silicate or as a coating material enables a particularly high filtration performance with low counter pressure at the same time.

The invention furthermore relates to a particle filter having a housing including a fluid inlet and a fluid outlet and a filter element arranged in the housing, in particular a filter element according to the statements in the context of this description, wherein the filter element has a porous filter body made of a ceramic material and including a plurality of flow channels fluidically extending in parallel. It is provided that the filter body is provided at least in a part of the flow channels with a coating of a coating material, which is different from the ceramic material and is made up of orthorhombic crystals.

The advantages of such an embodiment of the particle filter or the filter element have already been indicated. Both the particle filter and also the filter element can be refined according to the embodiments in the scope of this description, to which reference will therefore be made.

The particle filter has the housing and the filter element, which is arranged in the housing. The housing preferably surrounds the filter element completely, in particular in the circumferential direction with respect to a longitudinal center axis of the filter element. The housing includes the fluid inlet and the fluid outlet. A fluid inlet connection is associated with the fluid inlet, for example, and a fluid outlet connection is associated with the fluid outlet, wherein fluid to be filtered can be fed to and discharged from the particle filter via the fluid inlet connection and the fluid outlet connection. For example, an exhaust line of the exhaust system already described is connected to the fluid inlet and the fluid outlet via the fluid inlet connection and the fluid outlet connection, respectively. In this case, the particle filter can also be referred to as an exhaust gas particle filter.

The ceramic material from which the porous filter body is made is, for example, silicon carbide (SiC), cordierite, or a similar material. The filter body is produced from the ceramic material, for example by extrusion. During the extrusion, the flow channels extending fluidically in parallel can also be formed in the filter body. The formation of the filter body comprises, for example, a drying process and/or a firing process. This is the case in particular if the particle filter or the filter body consists of ceramic.

The fluid inlet is fluidically connected to the fluid outlet via at least a part of the flow channels. For this purpose, a large number of such flow channels are formed in the filter body. The filter body is preferably formed continuously. This is to be understood to mean that it is uninterrupted in the direction of its longitudinal center axis, that is to say it is not composed of multiple filter body parts arranged at a distance from one another in the axial direction. However, it can be provided that the filter body includes multiple filter bodies or is composed of these, wherein the filter body parts directly follow one another in the axial direction and in this case press against one another in the axial direction.

To achieve a particularly good filter performance of the particle filter, it is provided that the fluid flowing through the particle filter is forced to change the flow channels while it is flowing through the particle filter. In other words, the fluid flows in into one of the flow channels, is forced to overflow from one of the flow channels into another of the flow channels by the filter body or the ceramic material, and exits the filter body through this other one of the flow channels. The change in the flow channels is achieved by closing at least a part of the flow channels by means of closure plugs. If the fluid flows into the flow channel closed by means of the closure plug, it has to overflow through the porous filter body into the other of the flow channels, through which it can then flow to the fluid outlet.

For this purpose, it is preferably provided that on an inlet side of the filter body facing toward the fluid inlet, multiple flow channels are closed by means of first closure plugs and on an outlet side facing toward the fluid outlet, multiple flow channels are closed by means of second closure plugs. The first closure plugs and the second closure plugs are therefore provided for closing the flow channels of the filter body. The first closure plugs are arranged on the inlet side of the filter body and the second closure plugs are arranged on the outlet side of the filter body. At least the first closure plugs are arranged closer to the inlet side than the second closure plugs and, conversely, the second closure plugs are arranged closer to the outlet side than the first closure plugs. The inlet side is the side of the filter body facing toward the fluid inlet, and the outlet side is the side of the filter body facing toward the fluid outlet.

It can now be provided that a part of the flow channels is closed by means of the first closure plugs arranged on the inlet side and that at least a part of the flow channels that are not closed by means of a first closure plug is closed by the second closure plugs on the outlet side. In other words, the flow channels are closed in this case either by means of one of the first closure plugs or by means of one of the second closure plugs. Particularly preferably, at least one of the first closure plugs or at least one of the second closure plugs is arranged in each of the flow channels, so that all of the flow channels are closed either on the inlet side or on the outlet side. In such a configuration of the particle filter, the fluid usually only passes through the filter body once; a single change of the flow channels by the fluid is thus achieved. This results in a low counter pressure.

The invention finally relates to a method for producing a filter element described, in particular a filter element in the context of this description, wherein the filter element has a porous filter body made of a ceramic material and including a plurality of flow channels extending fluidically in parallel. It is provided that the filter body is provided at least in a part of the flow channels with a coating of a coating material, which is different from the ceramic material and is made up of orthorhombic crystals. With regard to the advantages and possible preferred embodiments, reference is again made to the statements in the context of this description.

A further embodiment of the invention provides that the filter body is provided with the coating by generating a fluid flow through the filter body, by which the coating material is suctioned on upstream of the filter body. As already explained, the fluid flow is preferably generated by generating a negative pressure on one side of the filter body. The coating material is now introduced into the fluid flow on the respective other side of the filter body, so that the coating material is suctioned in the direction of the filter body. On the side on which the coating material is introduced into the fluid flow, there is, for example, ambient pressure. The fluid flow is preferably generated in such a way that it has a flow velocity through the filter body of 2 m/s to 6 m/s. In this way, a particularly advantageous arrangement of the coating material in the form of the fluffy piles on the filter body is achieved.

Finally, in the scope of a further embodiment of the invention, it can be provided that the coating material is atomized by means of a pressure blasting device before it is introduced into the air stream. A conventional sandblasting gun, for example, is used as the pressure blasting device. The pressure blasting device atomizes the coating material by means of a gas flow, for example an air flow. A process pressure of the pressure blasting device of 2 bar to 6 bar is preferably used for atomizing the coating material. This reliably breaks up the coating material into individual particles. These individual particles can subsequently accumulate on the filter body in the form of fluffy piles, so that a high filtration performance of the filter element or particle filter is achieved with low counter pressure at the same time.

In addition, the invention relates to the use of a coating material made of orthorhombic crystals for coating a filter element, in particular a filter element according to the statements in the context of this description. The coating material and the method used for coating can be refined in accordance with the statements made in the context of this description. Reference is therefore made again to this.

BRIEF DESCRIPTION OF THE FIGURE(S)

In the following, the invention will be explained in greater detail with reference to the exemplary embodiments depicted in the drawings, without this restricting the disclosure. In the single FIGURE, FIG. 1 shows a schematic sectional view of a particulate filter, in particular for an exhaust system.

DETAILED DESCRIPTION

The FIGURE shows a schematic longitudinal sectional illustration of a particle filter 1, for example for an exhaust system. The particle filter 1 has a housing 2, which is only indicated here. The housing 2 can also be referred to as "canning" and is preferably made of metal. In the housing 2, a filter element 3 is arranged, which includes a porous filter body 4 made of a ceramic material. In the exemplary embodiment shown here, the filter body 3 has a jacket surface 5 which is implemented, for example, in the form of a coating and/or by corresponding processing of the filter body 3. For example, the jacket surface 5 is fluid-tight, that is, it closes the filter body 3 in the radial direction towards the outside. The filter body 3 is preferably arranged in the housing 2 in such a way that its jacket surface 5 is arranged spaced apart from the housing 2, for example by spacers 6. Alternatively, however, an embodiment of the particle filter 1 can also be implemented in which the jacket surface 5 of the filter element 3 presses against an inner circumferential surface of the housing 2, in particular continuously in the circumferential direction.

In the filter body 4, a plurality of flow channels 7 extending fluidically in parallel are formed, of which only a few are identified here by way of example. It can be seen that the filter element 3 is cylindrical, in particular circular cylindrical, with respect to its longitudinal center axis 8. However, other embodiments of the filter element 3, for example a conical shape, can also be implemented. The end face of the filter element 3 has two surfaces 9 and 10, which are connected to one another via the jacket surface 5. In the case of the cylindrical or circular cylindrical embodiment of the filter element 3, the surfaces 9 and 10 have the same surface area or at least a similar surface area.

The surface 9 is on an inlet side 11 and the surface 10 is on an outlet side 12 of the filter element 3. The inlet side 11 of the filter element 3 faces toward a fluid inlet 13 of the housing 2, whereas the outlet side 12 faces toward a fluid outlet 14 of the housing 2. A direction of flow of the exhaust gas through the particle filter 1 or the filter element 3 is indicated by the arrow 15. The flow channels 7 that are present in the filter element 3 or the filter element 4 are provided with first closure plugs 16 and second closure plugs 17, a few of which are each identified here by way of example. The first closure plugs 16 are in a first plug plane and the second closure plugs 17 are in a second plug plane.

The flow channels 7 can be divided into first flow channels and second flow channels 19, only a few of which are each identified by way of example. The flow channels 7 are preferably composed only of first flow channels 18 and second flow channels 19. There are preferably as many first flow channels 18 as there are second flow channels 19 or vice versa in the filter body 4. However, it can also be provided that the number of first flow channels 18 differs from the number of second flow channels 19, but preferably only by at most 10%, at most 7.5%, at most 5%, at most 2.5%, or at most 1%.

One of the first closure plugs 16, but none of the second closure plugs 17, is arranged in each of the first flow channels 18. In contrast, none of the first closure plugs 16 but one of the second closure plugs 17 is arranged in each of the second flow channels 19. This means that the first flow channels 18 are closed on the inlet side and open on the outlet side, whereas the second flow channels 19 are open on the inlet side and closed on the outlet side. A flow through the filter element 3 resulting therefrom is indicated by the arrows 20.

It is now provided that the filter body 4 is provided with a coating 21, at least in some of the flow channels 7, which consists of a coating material that is different from a ceramic material of the filter body 4. The coating material includes orthorhombic crystals and to this extent consists at least partially of a material, in particular of a mineral material, which contains such orthorhombic crystals. With the aid of this coating 21, the filtration performance of the particle filter 1 is significantly improved with low counter pressure or low pressure loss. Provision can be made for the coating 21 to be applied to the filter body 4 before the flow channels 7 are closed using the closure plugs 16 and 17. This enables a particularly simple production of the particle filter 1. However, it can also be provided that the coating 21 is only applied to the filter body 4 after the flow channels 7 have been closed using the plugs 16 and 17. As a result, the coating 21 is formed only in those flow channels 7 which are closed using the closure plugs 17, that is to say in which there are no closure plugs 16. In other words, the coating 21 is only formed in the second flow channels 19, but not in the first flow channels 18.

The filter body 4 is particularly preferably provided with a catalyst coating 22 at least in the flow channels 7 before the coating 21 is applied. The catalyst coating is a catalytically active coating, in particular a three-way coating, so that the filter 1 there works both as a particle filter and also as a three-way catalyst. After the catalyst coating 22 has been applied, the coating 21 is applied, namely according to the above statements. Accordingly, a filter body 4 results, for example, in which the catalyst coating 22 is only partially provided with the coating 21. A part of the catalyst coating 22 is thus provided with the coating 21, whereas another part of the catalyst coating 22 is free of coating. The catalyst coating 22 is preferably provided with the coating 21 only in the second flow channels 19, whereas it is present without a coating in the first flow channels 18.

LIST OF REFERENCE NUMBERS 1 particle filter
2 housing
3 filter element
4 filter body
5 jacket surface
6 spacer
7 flow channel
8 longitudinal center axis
9 surface
10 surface
11 inlet side
12 outlet side
13 fluid inlet
14 fluid outlet
15 arrow
16 first closure plug
17 second closure plug
18 first flow channel
19 second flow channel
20 arrow
21 coating
22 catalyst coating

The invention claimed is:

1. A filter element for a particle filter, comprising: a porous filter body made of a ceramic material and including a plurality of flow channels extending fluidically only in parallel, wherein the filter body is provided at least in a part of the flow channels with a mechanically atomized and suctioned coating made of a coating material, which is different from the ceramic material and is made up of orthorhombic crystals, the coating material has a specific surface area of at least 200 $m^2/g$, and an amount of material of the coating material applied to the filter body in relation to a total volume of the filter body is 2 g/l to 5 g/l.

2. The filter element according to claim 1, wherein the coating material includes particles having a grain size of at least 1 μm to at most 20 μm.

3. The filter element according to claim 2, wherein the coating material is applied to the filter body in such a way that the coating includes fluffy piles of the coating material wherein the fluffy piles are formed during application of the coating material to the filter body by particles of the coating material entangling with one another during the application, such that particles after formation of the coating have a larger grain size than individual particles before the formation of the coating.

4. The filter element according to claim 2, wherein the coating material includes a sheet silicate.

5. The filter element according to claim 4, wherein the sheet silicate is sepiolite or montmorillonite.

6. The filter element according to claim 1, wherein the coating material is applied to the filter body in such a way that the coating includes fluffy piles of the coating material wherein the fluffy piles are formed during application of the coating material to the filter body by particles of the coating material entangling with one another during the application, such that particles after formation of the coating have a larger grain size than individual particles before the formation of the coating.

7. The filter element according to claim 6, wherein the coating material includes a sheet silicate.

8. The filter element according to claim 7, wherein the sheet silicate is sepiolite or montmorillonite.

9. The filter element according to claim 1, wherein the coating material includes a sheet silicate.

10. The filter element according to claim 9, wherein the sheet silicate is sepiolite or montmorillonite.

11. A particle filter, comprising a housing including a fluid inlet and a fluid outlet and a filter element arranged in the housing according to claim 1.

12. A method for producing a filter element, in particular a filter element according to claim 1, wherein the filter element has a porous filter body made of a ceramic material and including a plurality of flow channels extending fluidically only in parallel, wherein the filter body is provided at least in a part of the flow channels with a mechanically atomized and suctioned coating made of a coating material, which is different from the ceramic material and is made up of orthorhombic crystals, the coating material has a specific surface area of at least 200 $m^2/g$, and an amount of material of the coating material applied to the filter body in relation to a total volume of the filter body is 2 g/l to 5 g/l.

13. The method according to claim 12, wherein the filter body is provided with the coating by generating a fluid flow through the filter body, by which the coating material is suctioned on upstream of the filter body.

* * * * *